UNITED STATES PATENT OFFICE.

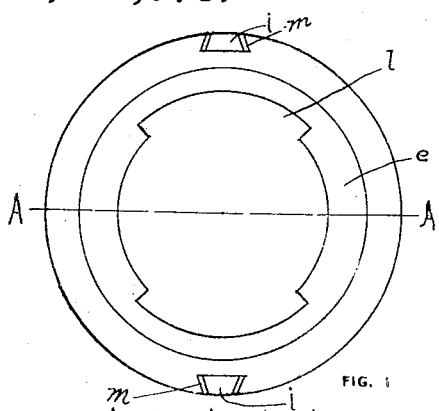
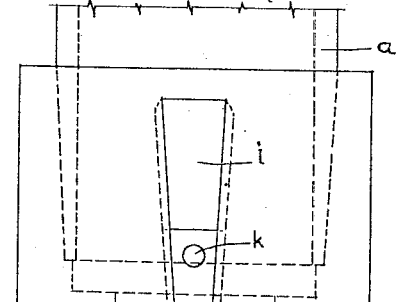
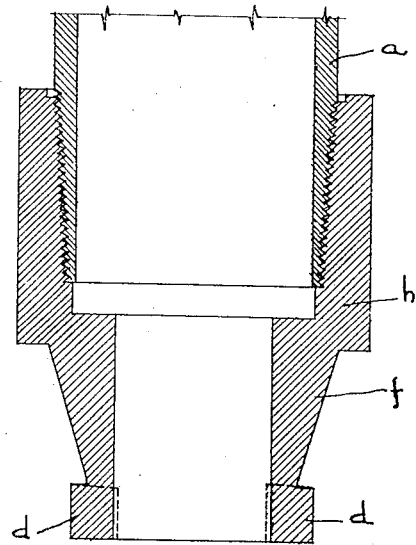
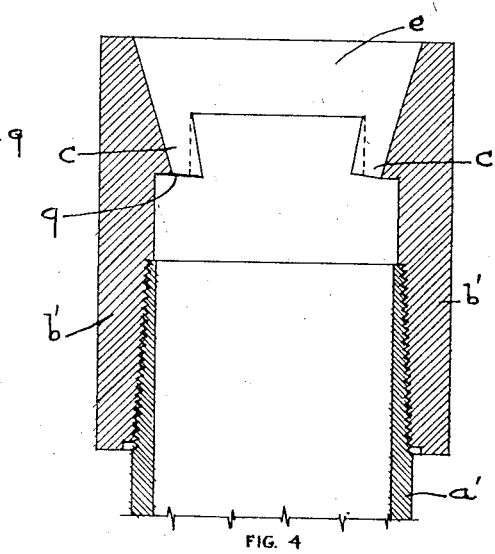

WILLIE A. McCULLAR AND JULES J. AYRAUD, OF BEAUMONT, TEXAS.

PIPE-COUPLING.

1,350,078.

Specification of Letters Patent.

Patented Aug. 17, 1920.

Application filed August 26, 1919. Serial No. 319,867.

*To all whom it may concern:*

Be it known that we, WILLIE A. McCULLAR and JULES J. AYRAUD, citizens of the United States of America, and residents of Beaumont, in the county of Jefferson and State of Texas, have invented certain new and useful Improvements in Pipe-Couplings, of which the following is a specification.

This invention relates to pipe couplings, and has for its object the provision of novel means whereby the joints of pipes may be speedily connected or disconnected, and, while the device is of primary importance in connection with pipes used for well drilling, it is, of course, susceptible to general application, and I do not wish to be limited with respect to the uses.

A further object of this invention is to provide novel means whereby a pipe joint may be produced having means for attaching ends of pipes to them, and the said coupling having interlocking members which can be readily detached, although provision is made for holding the parts in assembled relation to each other to guard against accidental disengagement.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a plan view of an end of one of the couplings embodying the invention;

Fig. 2 illustrates a view in elevation showing fragments of the pipes and the coupling;

Fig. 3 illustrates a sectional view of one member of the coupling and a fragment of the pipe; and Fig. 4 illustrates a section on the line A—A of Fig. 1.

In these drawings $a$ and $a'$ denote fragments of pipes which are connected to the couplings $b$ and $b'$, respectively, in known manner.

The coupling $b$ has a tapered extension $f$ terminating in flanges $d$ which are interrupted.

The member $b'$ has an inwardly tapered aperture $e$ at one end and the tapered wall is cut away as at $l$ to form clearances for the flanges $d$, whereas the uncut portion of the wall forms flanges $c$ which have shoulders $g$, under which the flanges $d$, after they have been inserted in the recesses $l$, are turned slightly to bring them into operative relation to the flanges $c$.

The taper of the extension $f$ and of the aperture $e$ are approximately the same degree, so that a tight joint is formed between the members of the coupling.

The shoulder $g$ is beveled so that when the flanges $d$ engage the shoulders $g$ in turning, a camming action results which tends to draw the contacting surfaces of the extension $f$, and a surface of the aperture $e$ into close engagement, so that a leak-proof joint will result.

Externally the members $b$ and $b'$ have coinciding channels $m$, and they preferably are tapered to receive the tapered keys $i$ which are wedged in the channels and serve to prevent rotary motion of one of the coupling members with relation to the other coupling member. Each key $i$ has an aperture $k$ for receiving a tool for lifting the key from its seat when the parts are to be disconnected.

From an inspection of the drawing and from the foregoing description it will be apparent that when the extension of the member $b$ is inserted in the aperture of the member $b'$, the flanges must aline with the recess $l$, and that when they have been inserted until the flanges pass the shoulders $g$ the members can be turned with relation to each other, and that when they are so turned the flanges $d$ will ride over the shoulders $g$, causing the coupling members to be drawn tightly together. Of course the rotation must be such as to cause the channels $m$ to aline, after which the key can be inserted to hold the parts together.

We claim:

In a pipe coupling, a member to which a pipe is connected, an extension of the said member tapered toward its end, the said extension terminating in flanges the ends of which are in separated relation to each other, a coupling member to which the pipe is connected, the end of said member remote from said pipe having an aperture with inwardly tapered walls, the said walls being recessed to form clearances for the flanges of the first mentioned member and the under surfaces of the said wall forming shoulders to engage the flanges of the first mentioned member, said members having coinciding external grooves the grooves being tapered from end to end, the reduced end of the groove of one member alining with the enlarged end of the groove of the other member and keys in said grooves conforming to the contour of the grooves in the two members.

WILLIE A. McCULLAR.
JULES J. AYRAUD.